(No Model.)
W. C. JEROME & B. D. BROWN.
BICYCLE SUPPORT.
No. 576,346. Patented Feb. 2, 1897.
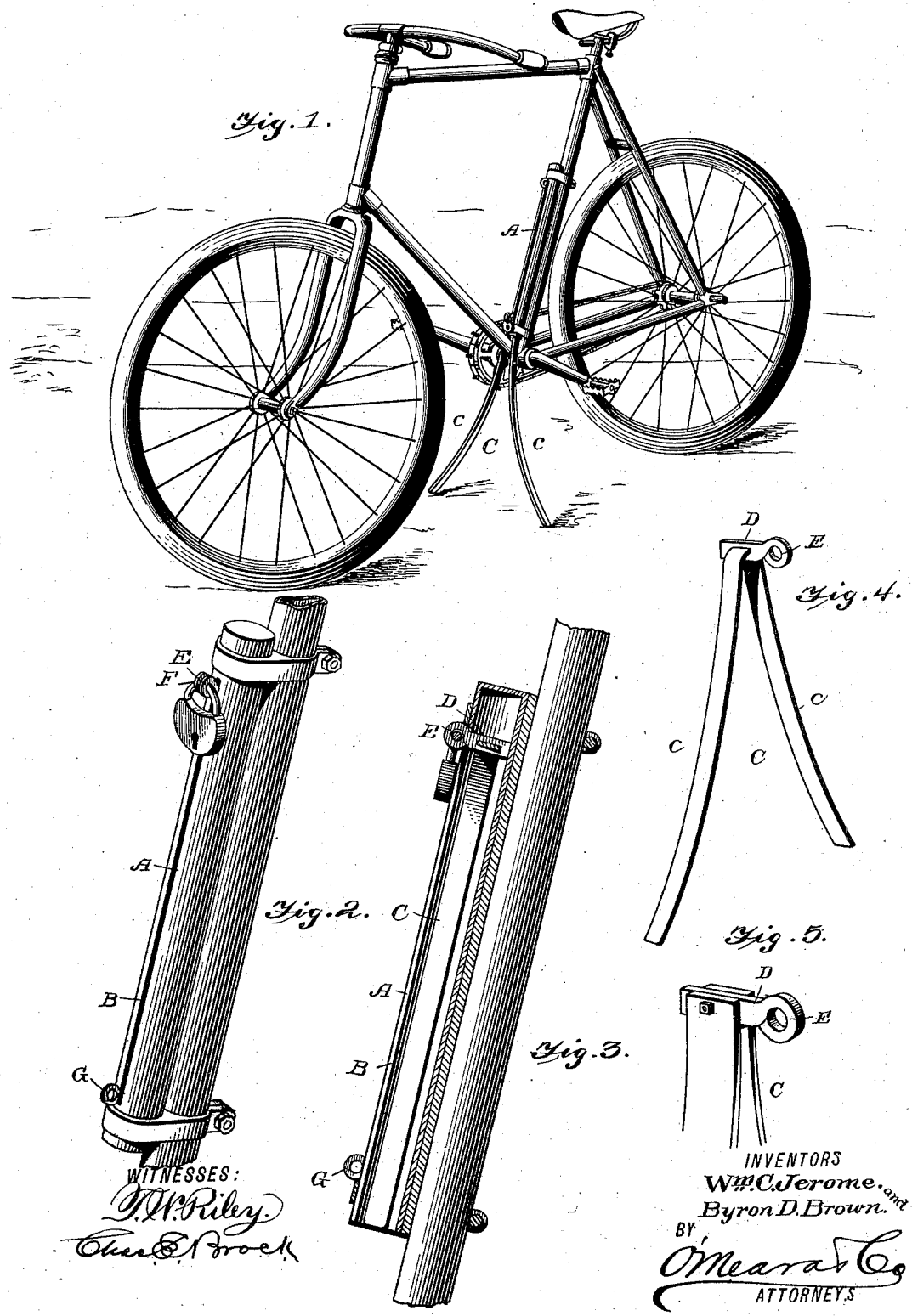

UNITED STATES PATENT OFFICE.

WILLIAM C. JEROME AND BYRON D. BROWN, OF MAYFIELD, NEW YORK.

BICYCLE-SUPPORT.

SPECIFICATION forming part of Letters Patent No. 576,346, dated February 2, 1897.

Application filed March 30, 1896. Serial No. 585,448. (No model.)

*To all whom it may concern:*

Be it known that we, WILLIAM C. JEROME and BYRON D. BROWN, residing at Mayfield, in the county of Fulton and State of New York, have invented a new and Improved Bicycle-Support, of which the following is a specification.

This invention relates generally to bicycle-supports, and more particularly to an improved portable support or one that is carried upon the bicycle-frame, so that it can be brought into operation whenever desired.

The object of the invention is to provide a simple construction of support which can be attached to any of the ordinary frames now in use and can be quickly and easily thrown into operative position, thereby permitting the rider to leave the bicycle in an erect position without leaning it against the curb, tree, or any other rigid support.

Another object is to provide a bicycle-support which can be quickly and easily thrown into operative position and locked in such position, thereby preventing any one from surreptitiously carrying off the bicycle.

Another object is to provide a bicycle-support which can be applied to tandems the same as an ordinary bicycle, and a still further object is to provide a support which will occupy very little space and which when applied to the bicycle-frame will not become a noticeable feature or detract from the looks of the bicycle.

Another object of the invention is to provide a bicycle-support which can be applied to machines of different heights.

With these various objects in view our invention consists in the peculiar construction and arrangement of the various parts, all of which will be fully described hereinafter, and pointed out in the claim.

In the drawings forming a part of this specification, Figure 1 is a view of a bicycle provided with our improved support, showing the support in use. Fig. 2 is an enlarged detail view of the support and the portion of bicycle to which it is attached. Fig. 3 is a vertical sectional view of the support. Figs. 4 and 5 show details of construction.

In carrying out our invention we employ a tubular member A, which is securely connected to the central member of the bicycle-frame in any suitable manner. This tubular member is slotted longitudinally, as shown at B, said slot extending from a point near the bottom of said tube to a point near the top of the same. Sliding within this tubular member are the spring supporting-rods C, said rods being composed of stout spring-steel, but of sufficient fineness to slide freely within the tube, said tube being made somewhat smaller than the central tubular member of the bicycle-frame. These spring supporting-rods C are curved outwardly, as shown at c, in diverse directions, and at their upper or inner ends said spring-rods are attached to a sliding key D, which works in the slot B and has a suitable loop or handle E at the outer end. By means of this sliding key it is clear that the supporting-rods can be projected downwardly or drawn upwardly into the tube, as desired, and whenever it is desired to support the bicycle said key is forced down, forcing out the supporting-rods, which, being of spring metal, separate and rest upon the ground at two points, and inasmuch as the tube is arranged between the wheels it is clear that the bicycle will rest upon four points instead of two points and will therefore stand firmly in an upright position. The spring-rods can be made separate and attached to the sliding key in any suitable manner, or said rods may consist of a single piece of metal bent centrally upon itself and passed through the body of the key.

In order to securely hold the supporting-rods in their raised position, we arrange a staple F at the upper end of the tubular member in such a position that when the key is slid to its uppermost position the loop or handle of said key can be readily brought into register with the said staple and a padlock passed through said staple and loop, and in order to lock the supporting-rods in their lowered or supporting position we arrange a similar staple G at the lower end, so that when the key is slid down and the rods spread to their supporting position the loop of the key will be in register with said staple G, and then the same padlock may be employed to hold the supporting-rods in such adjusted position.

It will thus be seen that we provide an exceedingly cheap and simple form of portable bicycle-support capable of being attached to any of the bicycles now in use without detracting in the least from their purpose or without increasing their weight to any material extent.

In order to employ our improved form of support upon bicycles of different heights, the tube can be made of varying lengths, or the slot can be made longer or shorter and the locking-staples arranged accordingly. It is also obvious that instead of attaching the tubular member to the central bar it can be attached to either the fork or the rear portion of the frame.

Having thus described our invention, what we claim as new, and desire to secure by Letters Patent, is—

In a bicycle-support, a tubular member slotted longitudinally, and the locking-staples at the lower and upper ends, the spring supporting-rods, the sliding key having a loop or handle, and means for securing said loop or handle to the upper or lower staple, substantially as shown and described.

WM. C. JEROME.
BYRON D. BROWN.

Witnesses:
DAVID GETMAN, Jr.,
HELEN GETMAN.